CICERO C. BROWN
INVENTOR.

Sept. 16, 1969　　　　　　　　C. C. BROWN　　　　　　　　3,467,202
HYDRAULICALLY DRIVEN POWER HEAD
Filed June 11, 1968　　　　　　　　　　　　　　　3 Sheets-Sheet 3

CICERO C. BROWN
INVENTOR.

BY

ATTORNEY

United States Patent Office 3,467,202
Patented Sept. 16, 1969

3,467,202
HYDRAULICALLY DRIVEN POWER HEAD
Cicero C. Brown, % Brown Oil Tools Inc.,
P.O. Box 19236, Houston, Tex. 77024
Filed June 11, 1968, Ser. No. 736,179
Int. Cl. E21c 5/00
U.S. Cl. 173—57                                    10 Claims

ABSTRACT OF THE DISCLOSURE

A power drilling head formed of a housing containing a plurality of vertically extending, reversible, hydraulic motors. Each motor has a gear in contact with a ring gear operatively attached to a vertical spindle which may be used to rotate drill pipe. The gear section of the housing is sealed off and supplied with seepage of hydraulic fluid from the hydraulic motors. Any excess is returned to the hydraulic system. The head may be suspended from a derrick by a traveling block which vertically positions it. Means are provided to maintain the head non-rotative.

---

This invention is directed to a means for rotating drill pipe and, more particularly, to a hydraulically driven power head.

Formerly, it was quite common to erect a permanent derrick at the well site. Although the derrick was often left in place, the drawworks which was used to provide rotary power was removed. Accordingly, when rotary power was required in working over the well, it was necessary to either bring in new drawworks or remove the derrick and utilize a portable rig. Accordingly, one of the objects of the present invention is to provide a portable power drilling head which can be attached to a derrick to provide power for rotating a drill string.

This and other objects are accomplished by a housing adapted for suspension in a derrick from a traveling block and swivel. The head is provided with a plurality (four in the illustrative embodiment) of vertically extending, reversible, hydraulic motors. Each motor is provided with a gear which is meshed with a ring gear operatively connected to a hollow vertical spindle adapted to be attached to the upper end of a drill string. Means are provided so that fluid can be circulated through the drill string. To lubricate the gears, the gear section of the housing is sealed off and supplied with seepage from the hydraulic motors. An overflow line returns any excess to the reservoir. Accordingly, it is another object to provide a hydraulically powered head having a sealed gear section which is lubricated by the oil used to power the hydraulic motors.

Other and more specific objects and advantages of this invention will become more readily apparent from the following detailed description when read in conjunction with the accompanying drawing which illustrates one useful embodiment in accordance with this invention.

Figure 1:
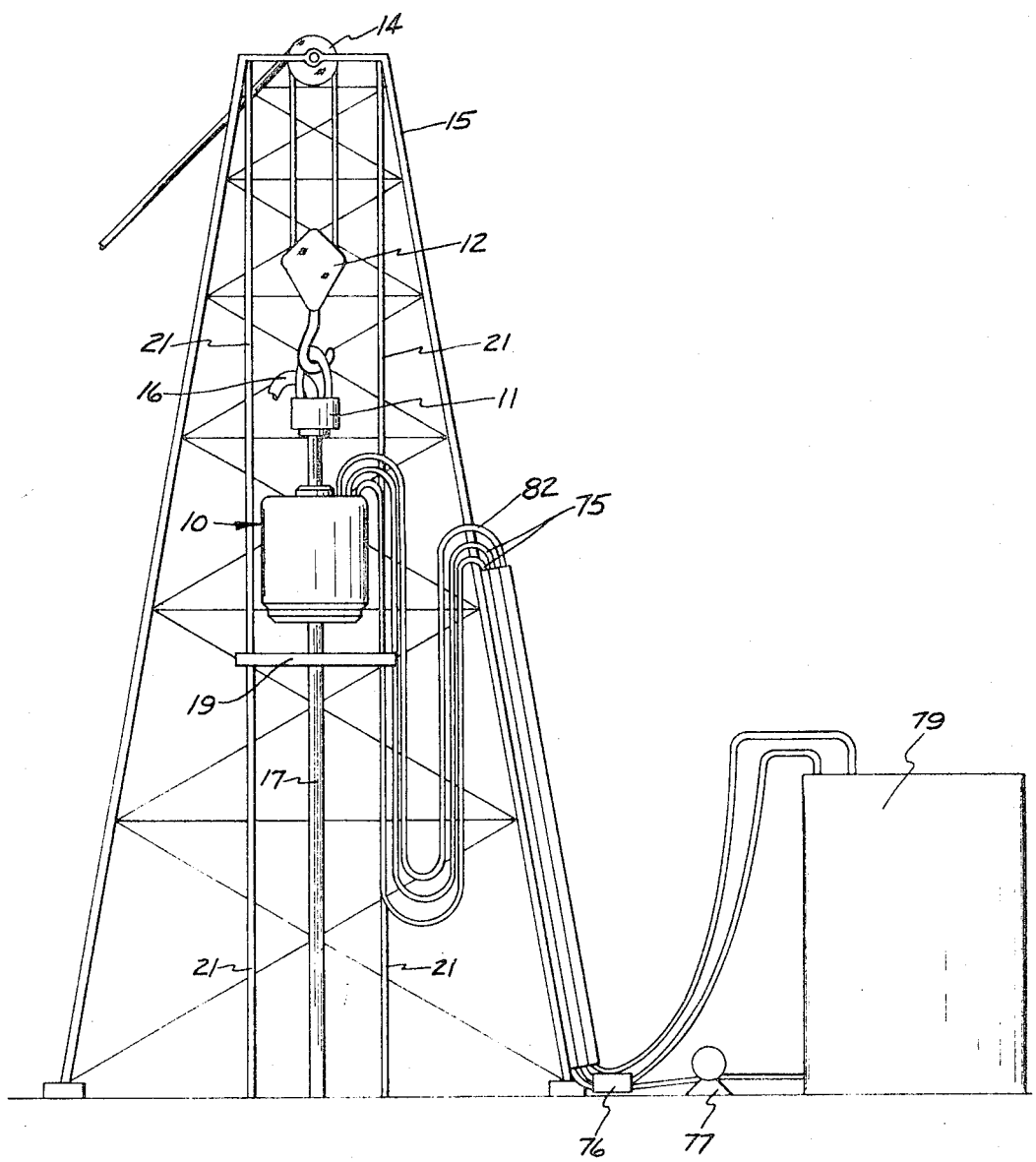
FIG. 1 is an elevational view of a derrick in which a portable power head of the present invention is installed.
Figure 2:
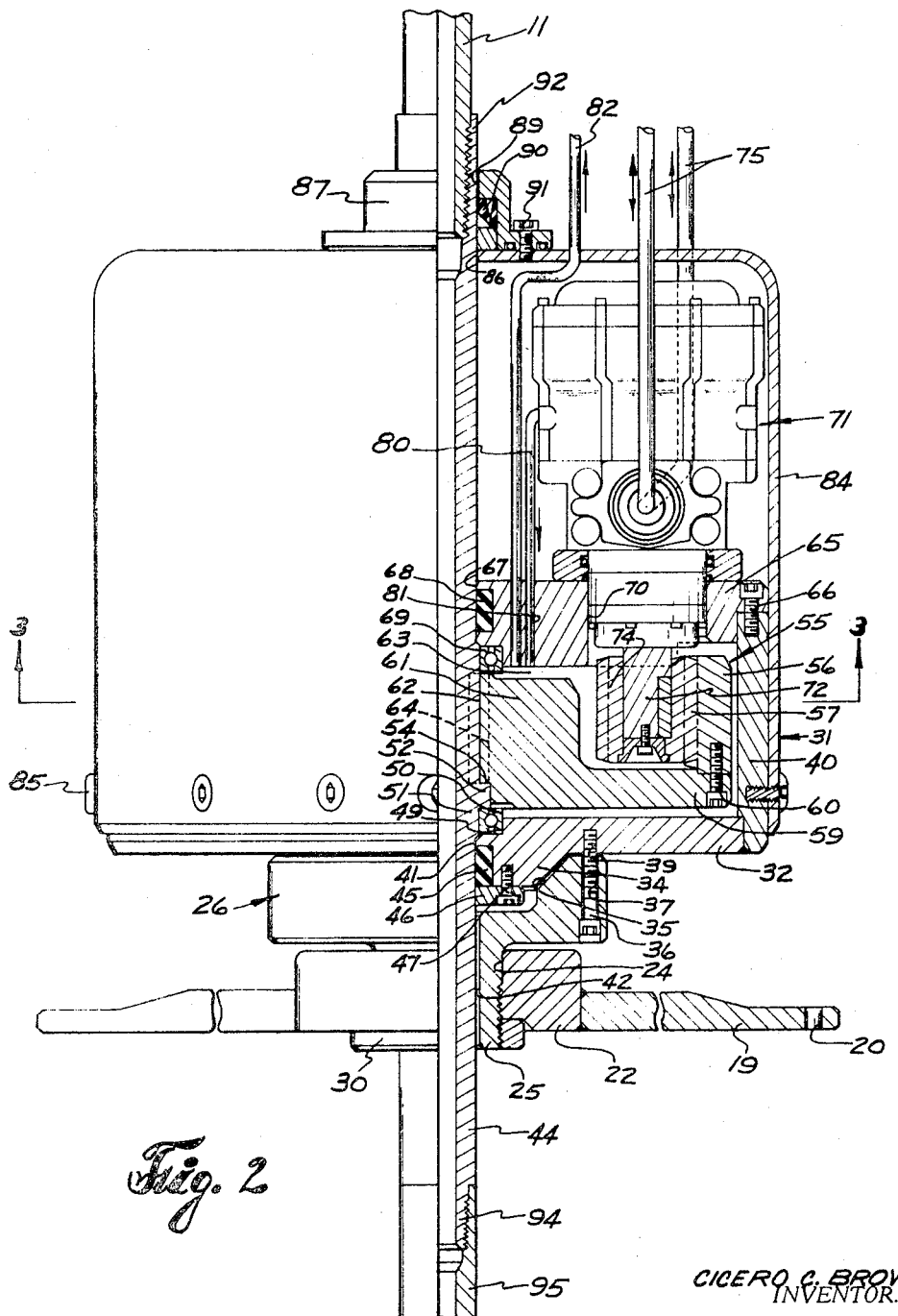
FIG. 2 is a vertical elevational view, half in section, of the portable power head shown in FIG. 1.
Figure 3:
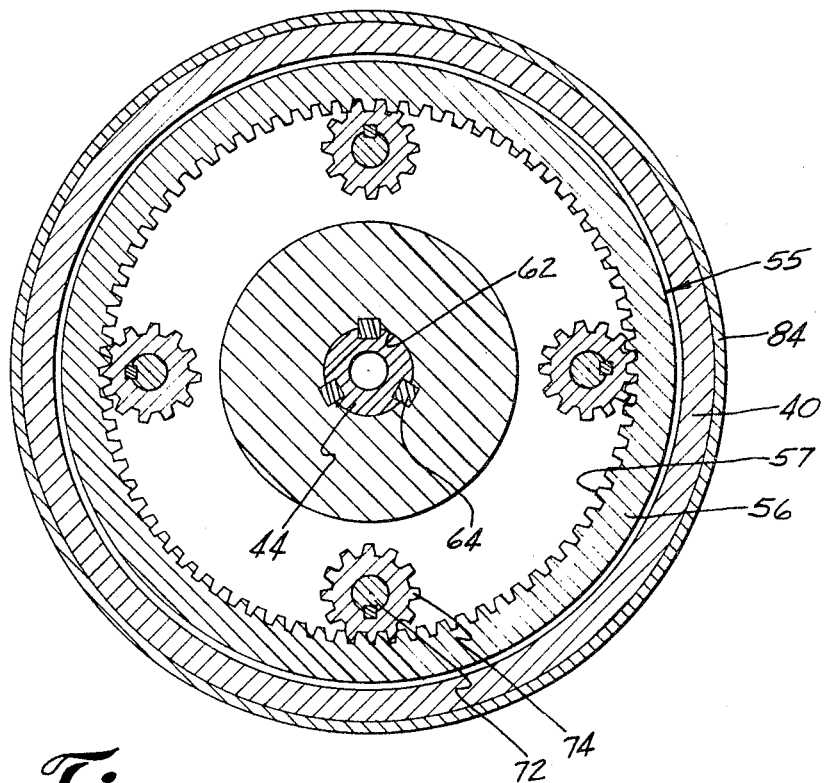
FIG. 3 is a cross section view taken generally along lines 3—3 of FIG. 2.

Turning now to FIG. 1, a power drilling head 10 of the present invention is attached to a swivel 11 suspended from a traveling block 12 attached to crown block 14 of a derrick 15. A gooseneck 16 is attached to the top of the power drilling head so that circulation may be provided through a drill string 17 which is connected to the bottom of the power drilling head.

To maintain the power drilling head non-rotatively and in proper alignment, the power drilling head is provided with a transversely extending spider forming arms 19, each of which has an aperture 20 near its outer end. Vertical members 21 attached to the floor and the top of derrick 10 extend through the apertures.

Accordingly, the power drilling head may be raised or lowered by traveling block 12 while being maintained non-rotative and in alignment over the well bore by vertical members 21.

Spider member 19 has a central portion 22 provided with an internally threaded central bore 24 adapted to threadedly receive neck 25 of a hub 26 which is fixedly attached to central portion 22. Located on top of hub 26 is housing 31 for the driving mechanism of the power drilling head.

Housing 31 is formed of a transversely extending circular plate 32 having a frusto conical central portion 34 which is nested in a mating inverted frusto conical socket 35 in hub 26. A plurality of cap screws 36 located in circumferentially spaced apertures 37 of hub 26 are threadedly engaged apertures 39 in plate 32 to attach plate 32 to hub 26. An annular ring member 40 is welded to the periphery of plate 32.

Hub 26 and plate 32 are provided with central apertures 41 and 42 through which extends a vertical spindle 44. A seal member 45 is located in an enlarged portion at the bottom of aperture 41 to form a seal between spindle 44 and the wall of aperture 41. A plate 46 is attached to the bottom of frusto conical portion 34 by studs 47 and retains seal member 45 in sealing contact in the enlarged portion. The top portion of aperture 41 is enlarged to provide a pocket 49 for ball bearing 50 which is journalled on an enlarged portion 51 of spindle 44. Above enlarged portion 51, spindle 44 is provided with a second enlarged portion 52 which forms an upper shoulder 54.

A ring gear 55 is connectively attached to spindle 44. The ring gear is formed of an annular member 56 having gear teeth 57 on its inner surface. Annular member 56 is attached to a circular hub portion 61 provided with a stepped central bore 62 which telescopes over spindle 44 and is vertically positioned thereon by shoulder 54. A key 64 positioned in mating slots in spindle 44 and bore 62 makes the connective attachment between the ring gear and the spindle.

Attached to the top of annular member 40 by threaded members 66 is a circular plate 65 having a central bore 67 through which spindle 44 extends. The wall forming bore 67 is provided with a pocket in which is located a seal member 68 which forms a seal between spindle 44 and bore 67. The bottom of bore 67 is enlarged to accommodate a bearing 69 journalled on spindle 44.

Circular plate 65 is provided with four circumferentially spaced holes 70 over each of which is mounted a motor 71 having a vertical shaft 72 extending through hole 70. Attached to vertical shaft 72 is a gear 74 which is meshed with gear teeth 57 of ring gear 55. Each motor 71 may be a reversible hydraulic motor such as a Dennison Fluid Motor, Series 700 manufactured by Dennison Engineering Company of Columbus, Ohio. Hydraulic supply and return lines 75 extend from motor 71 to a switch block 76 (FIG. 1) which selectively connects the lines 75 to either a hydraulic pump 77 or reservoir 79. The direction of rotation of shaft 72 and consequently the direction of rotation of spindle 44 will depend upon which line 75 delivers hydraulic fluid from pump 76 to motor 71.

A drain line 80 from the casing of motor 71 passes through an aperture 81 in plate 65. Accordingly, seepage from motor 71 provides hydraulic oil to the sealed gear compartment 63 for lubrication of gears 55 and 74. An overflow line 82 is provided to bleed any excess fluid from gear compartment 63 to reservoir 79. Accordingly, hydraulic motors 71 not only provide rotative power for spindle 44 but also lubrication for the gears. As mentioned, direction of rotation of the spindle will depend upon which line 75 is connected to pump 77 and speed of rotation will depend upon the speed of pump 77.

Enclosing motors 71 is an inverted cup-shaped shell 84 which is attached to annular member 40 by threaded members 85. Circular plate 65 divides the housing into a motor compartment and a sealed gear compartment. An aperture 86 is located in the top of shell 84 through which spindle 44 extends. A hub 87 having an aperture 89 with a seal 90 is attached to the top of shell 84 by threaded members 91 to seal about the upper end of spindle 44.

The upper end of spindle 44 is provided with female pipe threads 92 to which the end of swivel 11 is threadedly attached. The lower end of spindle 44 is provided with male pipe threads 94 for threaded engagement with the end of tubing string 17. Spindle 44 is provided with a central longitudinal passage 96 so that fluid from gooseneck 16 may be supplied to drilling string 17.

As can be seen, the present invention provides a portable power drilling head which may be easily non-rotatively attached to a derick for providing rotative power at the well site. The power drilling head is driven by reversible hydraulic motors, and accordingly, the speed and direction of rotation can be easily controlled. The power drilling head can be easily raised and lowered as drilling proceeds and fluid can be supplied to the rotating tubing string.

It will be understood that various changes and modifications may be made in the details of the illustrative embodiment within the scope of the appended claims but without departing from the spirit of this invention.

What I claim and desire to secure by Letters Patent is:

1. A power drilling head comprising: a vertical spindle adapted to be attached to a pipe string, an annular ring gear having radially extending gear teeth connectively attached to said spindle, a transversely extending plate positioned oved said ring gear, said plate having a passage in which the vertical spindle is journalled, means to maintain said plate non-rotative, a plurality of reversible hydraulic motors mounted on said plate, a hydraulic system for delivering fluid to the motors, each motor having a vertical shaft provided with a gear meshed with the teeth on said ring gear whereby actuation of the hydraulic motors will rotate the vertical spindle.

2. The apparatus specified in claim 1 including a housing encasing said apparatus, said plate dividing the housing into a motor compartment and a sealed gear compartment, and a conduit extending from at least one of said motors for delivering fluid from said motors to the sealed gear compartment to provide lubrication for the gears.

3. The apparatus specified in claim 1 including the vertical spindle being provided with a central passage for providing fluid communication to the pipe string attached to the lower end of the vertical spindle.

4. The apparatus specified in claim 2 whrein the means for maintaining the apparatus non-rotative includes a transversely extending spider member non-rotatively attached to the housing and means for non-rotatively securing said transversely extending spider member.

5. The apparatus specified in claim 1 in which a vertically depending flange is atached to the edge of said transversely extending plate and a second transversely extending plate having a central passage through which the vertical spindle extends is attached to the bottom of the flange below the ring gear, members forming seals between the spindle and the passages through which it extends, whereby a sealed compartment is formed, and a conduit extending from at least one of the motors to the sealed gear compartment to provide lubrication for the gears.

6. The apparatus specified in claim 5 including an overflow conduit from the gear compartment to the hydraulic system for return of excess fluid from the gear compartment.

7. The apparatus specified in claim 5 including an inverted cup-shaped shell the top of which has a centrally located aperture telescoped over the vertical spindle and the side wall of the shell extending over the vertically depending flange.

8. The apparatus specified in claim 1 wherein the inner annular surface of the ring gear is provided with radially inwardly extending gear teeth.

9. The apparatus specified in claim 1 including means to suspend the apparatus.

10. A power drilling head comprising: a pair of vertically spaced, transversely extending plates, a flange attached to the peripheral edges of the plates, each plate having a central passage, a vertical spindle having a central longitudinal passage extending therethrough journalled in the central passages of the plates, means forming a seal between the spindle and the passages through which it extends thereby forming a sealed compartment, a ring gear having inwardly extending gear teeth located in the sealed compartment and connectively attached to the vertical spindle, a plurality of hydraulic motors atached to the upper plate, each motor having a vertical shaft sealingly extending through the plate, a gear on each shaft meshed with the ring gear, a hydraulic system for providing fluid power to the motors, a conduit from at least one of the motors to the sealed compartment to provide lubrication for the gears, a conduit from said sealed compartment for returning excess fluid to the hydraulic system, and means to maintain the power drilling head non-rotative.

References Cited

UNITED STATES PATENTS

| | | | |
|---|---|---|---|
| 2,772,074 | 11/1956 | Stoffa | 173—57 X |
| 2,860,487 | 11/1958 | Wheeler | 173—57 X |
| 2,863,638 | 12/1958 | Thornburg | 173—57 |
| 3,054,465 | 9/1962 | Fish | 173—57 X |
| 3,191,450 | 6/1965 | Wilson | 173—57 X |
| 3,209,543 | 10/1965 | Glover | 175—195 X |

NILE C. BYERS, JR., Primary Examiner

U.S. Cl. X.R.

175—195